United States Patent [19]

Geskin

[11] 4,434,003

[45] Feb. 28, 1984

[54] STEEL MAKING METHOD

[76] Inventor: Ernest S. Geskin, Townhouse #3, Meadow East, Potsdam, N.Y. 13676

[21] Appl. No.: 216,643

[22] Filed: Dec. 15, 1980

[51] Int. Cl.³ .............................................. C21B 11/00
[52] U.S. Cl. ........................................... 75/24; 75/40; 266/44
[58] Field of Search .................... 75/40, 11, 29, 30, 38, 75/24, 60, 59, 46; 266/138–141

[56] References Cited

U.S. PATENT DOCUMENTS

| | | | |
|---|---|---|---|
| 1,269,974 | 6/1918 | Stevenson | 266/138 |
| 2,612,444 | 9/1952 | Rummel | 75/40 |
| 3,264,096 | 8/1966 | Agarwal et al. | 75/40 |
| 4,306,901 | 12/1981 | Szekely et al. | 75/34 |

FOREIGN PATENT DOCUMENTS

| | | | |
|---|---|---|---|
| 52-22594 | 2/1977 | Japan | 266/44 |
| 52-41195 | 3/1977 | Japan | 266/44 |
| 1046675 | 10/1966 | United Kingdom | 75/40 |

*Primary Examiner*—M. J. Andrews
*Attorney, Agent, or Firm*—Kenway & Jenney

[57] ABSTRACT

Iron or steel products are produced from oxide ores in a unique process which utilizes air and regular coal as its primary energy source and wherein the ore is melted in a carbon dioxide zone for separation and absorption of the iron oxides into a slag which is transferred to a carbon-monoxide generating zone. In the latter zone the iron oxides are reduced to form the iron or steel product. Carbon monoxide containing flue gas from the latter zone is burned with air and utilized as a heat source in the carbon dioxide zone. Slag from the various unit processes is collected and used to preheat process air by either continuous operation or in a semi-continuous regeneration process. In both modes of slag preheating, flue gas is utilized to maintain the temperature of the slag bath and high temperature air preheating prior to the slag bath. The molten metal is refined by atomizing in slag or protective gas and may be formed into a sheet by extrusion through a slot-shaped orifice into a space defined between two perforated plates, with a protective gas injected through the perforations serving to support the metal sheet as it solidifies and cools. The thermomechanical treatment of the metal may be carried out by the simultaneous cooling and rolling in a protective atmosphere.

19 Claims, 10 Drawing Figures

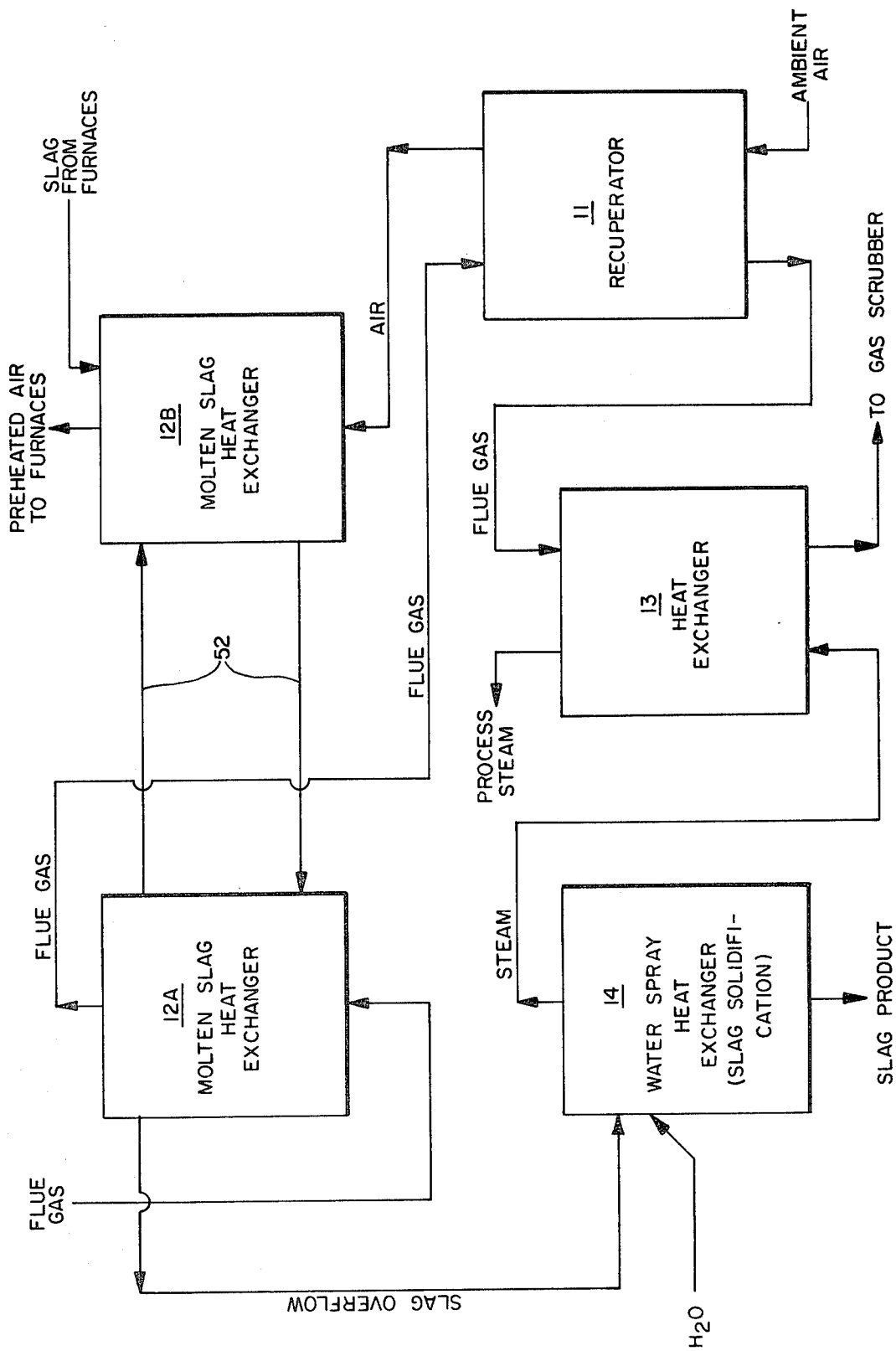

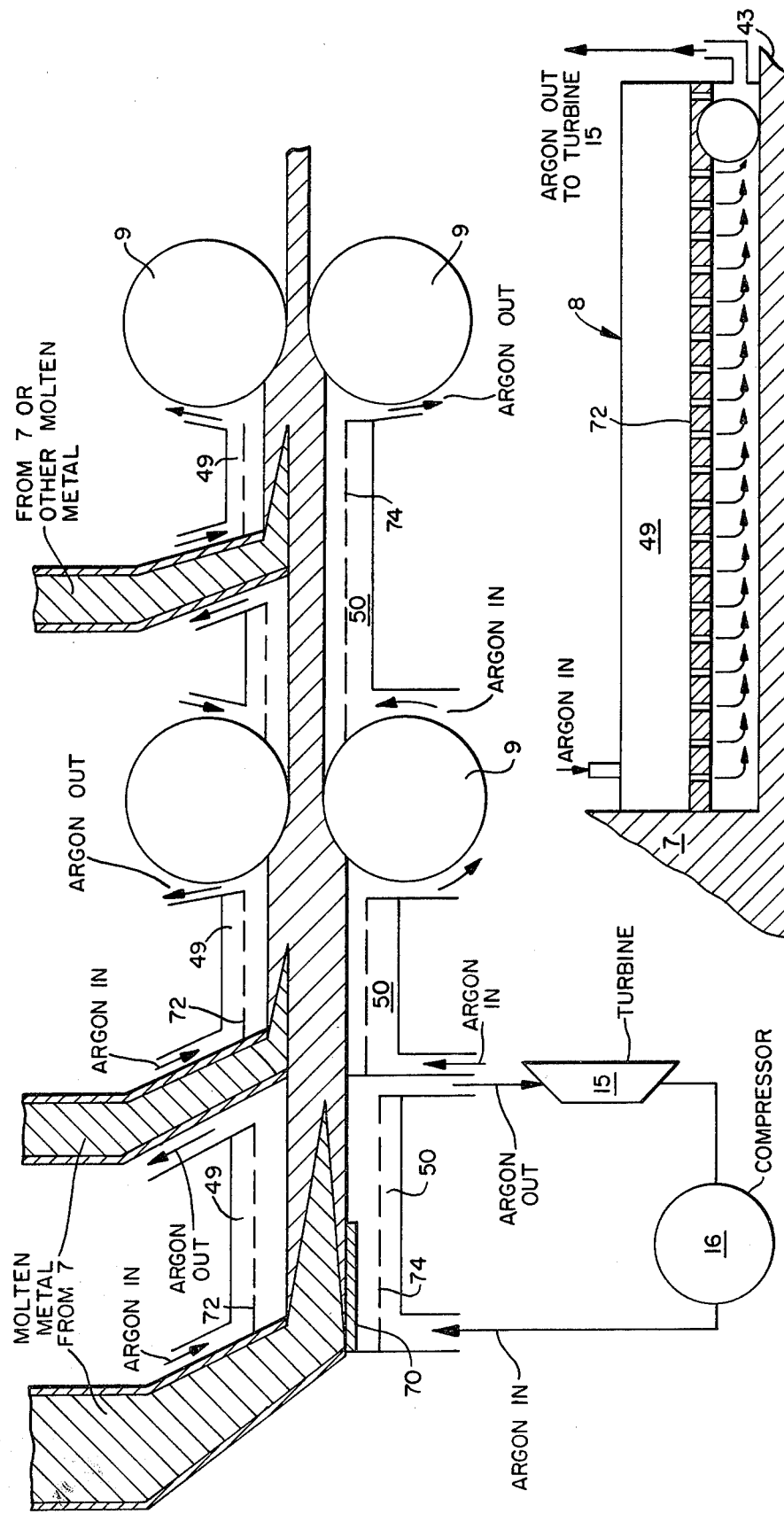
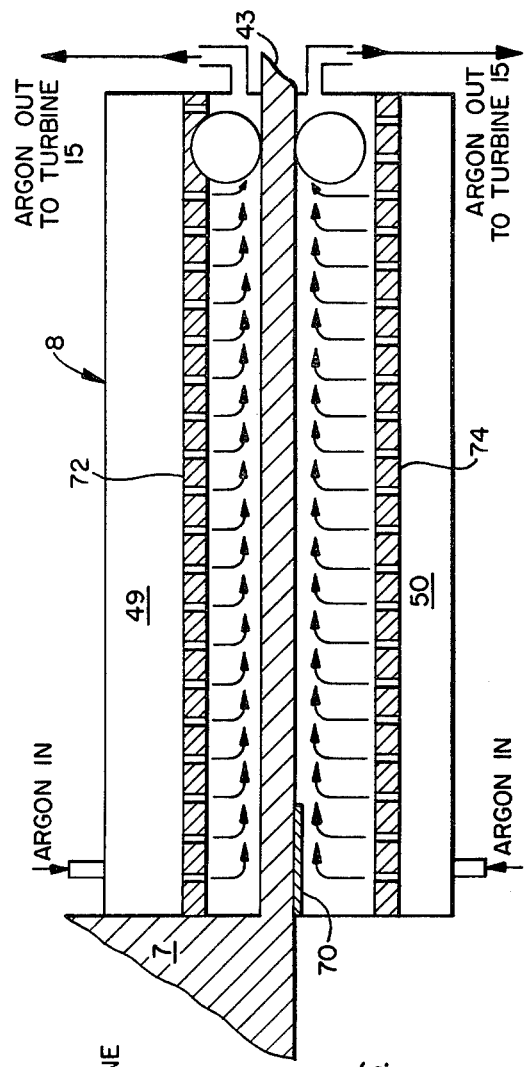
FIG. 7
FIG. 6

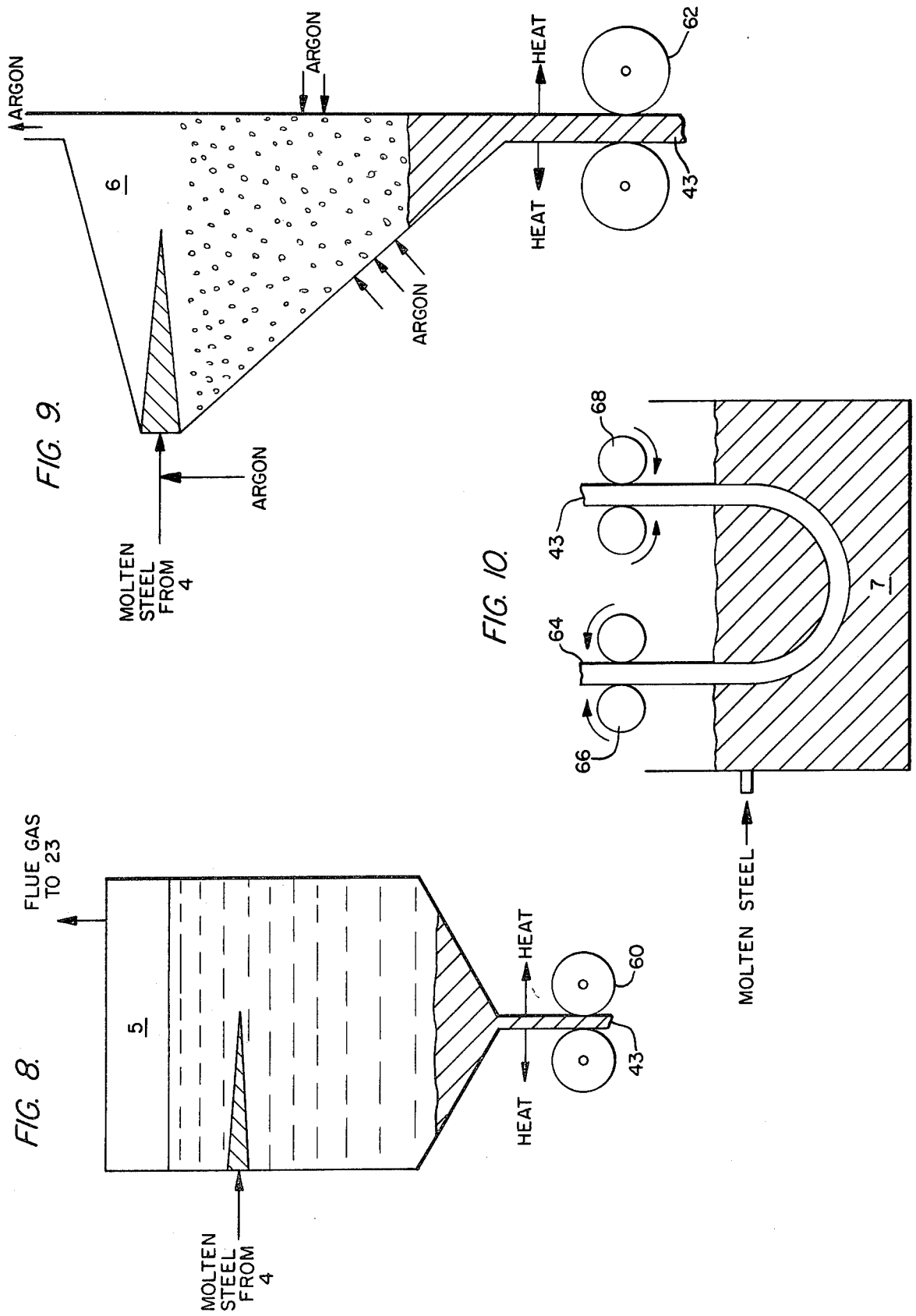

STEEL MAKING METHOD

BACKGROUND OF THE INVENTION

Drastic increases in the cost of petroleum fuels and electrical energy have forced many energy intensive industries, including the metallurgical industry, to adapt to alternate sources of energy, i.e. regular coal, and to search for means of energy conservation. Many of the metallurgical processes in current use require energy intensive ancillary processes for coke production, pellet production, oxygen production, etc. In most of these conventional processes the sensible heat of the molten metal and waste slag is simply lost. The prior art batch and semi-continuous processes which require transfer of the metal melt from one furnace to another or to and from a ladle all evolve a substantial amount of pollutants and heat into the atmosphere during each transfer and are to that extent thermally inefficient and a source of pollution. Further, the low rate of metal processing in comparison to the high volume of gases which characterizes the conventional processes, requires high surface area of furnace per ton of metal produced and results in correspondingly high heat losses.

Accordingly, it is an object of the present invention to provide a process of high thermal efficiency and low energy consumption for the production of steel and steel products (cast, sheets, strips, powder, etc.) from the iron ore, scrap, etc.

It is another object of the invention to provide a thermally efficient process in which regular coal may be used as the only or primary source of energy.

Yet another object is to integrate the various smelting, refining, solidification and shaping steps involved in the manufacture of steel products into a single continuous process wherein the various unit processes are conducted in sealed vessels connected in series.

Yet another object of this invention is total utilization of the channel energy of coal in metallurgical processes.

Still another object is to provide techniques whereby the sensible heat of flue gases, molten metal, and waste slag can be recovered and recycled within a metallurgical process.

Still another object of the present invention is to provide a process fulfilling the foregoing objectives with minimum atmospheric pollution and heat losses.

Still another object of the invention is the improvement of metal quality by deep refining, controlled solidification, thermal-mechanical treatment and surface protection.

These and other objects and features of the present invention will become apparent from the detailed description to follow, taken in conjunction with the accompanying drawings.

SUMMARY OF THE INVENTION

In accordance with the present invention a thermodynamically optimized heat balance is provided in an integrated process for producing steel products from iron ore and coal (and optionally scrap) in which regular coal may be used as the sole or principal source of energy. The overall process is extremely thermally efficient due to utilization of heat from molten waste slag, heat from the flue gas, and heat liberated by the molten metal during solidification, termination of ancillary operations and reduction of heat losses.

In one aspect, the present invention provides for the separation of melting and reduction. This enables smelting in an oxidizing atmosphere and total utilization of the chemical energy of carbon monoxide produced in a smelting zone, as well as extraction of readily oxidized impurities prior to reduction.

The present invention provides for melting fluxing agents and the iron oxide ore together in a first zone to form a molten slag. The iron oxides are selectively absorbed into the slag thereby producing a densified slag. The slag in the first zone tends to stratify with the denser, iron oxide-rich slag collecting at the bottom of the zone. The iron oxide-rich slag phase is transferred from the bottom of the first zone to a second zone wherein coal is injected into the molten slag to reduce the iron oxides and liberate the metal product which separates as a separate lower phase. Flue gas from the second zone containing carbon monoxide is injected into the slag in the first zone along with an additional amount of air for combustion of the carbon monoxide, which combustion serves as a source of heat for operation of the first or melting zone.

The first (melting) zone and the second (reducing) zone may be established in separate furnaces with the first zone positioned vertically above the second zone to facilitate transfer of the iron oxide-rich slag from the first zone to the second zone. The second zone contains pools of ferrous metal and slag. The slag from the first zone can be fed into the slag of the second zone and reduced by the coal supplied into this slag or the slag from the first zone can be fed into the metal body and reduced by the carbon dissolved in the metal phase.

Alternatively, a single unitary body of molten slag may be divided into a lower second zone and an upper first zone by appropriate distribution of air jets, and of coal and ore injection points around the slag body. In this latter embodiment the body of melt is cylindrical in shape and air jets arranged around the upper circumference of the reactor create a flow pattern of molten slag which moves radially toward the center of the body of molten slag. As the molten slag moves radially through the first (melting) zone it becomes densified by release of gas into the space in the reactor above the melt surface. The densified slag will sink, i.e. circulate, downwardly through the center of the lower second zone carrying with it the absorbed iron oxides. Coal and air, in a stoichiometric ratio where combustion results in the generation of carbon monoxide, are introduced at the periphery of the lower portion of the melt body, whereby an annular reducing zone is formed around the central downwardly moving slag flow. The carbon monoxide generated within the reducing zone and residual air components carry the slag upwardly toward the second zone where carbon monoxide is oxidizing to carbon dioxide. The major portion of the coal is injected into the second zone; however, a minor portion of the coal may also be injected into the first zone as necessary to provide sufficient heat for ore and flux melting.

Another key aspect of the present invention is the collection of molten waste slag and its use to preheat process air, for example, the process air to zones 1 and 2 mentioned above. Incoming process air is dispersed into and passed through the collected waste slag, in direct contact therewith, whereby the incoming air is preheated to a temperature approaching that of the collected waste slag. In one suggested mode of operation the collected molten waste slag is divided into first and second heat exchange sections with continuous circulation of the molten slag between the two sections. Flue gas from one or more of the process furnaces is passed through the molten slag in the first section to continuously heat the slag pool while the process air is being passed through the molten slag in the other section to preheat the air. In this mode of operation the air may be preheated in two stages utilizing a first stage air preheater wherein the flue gas exiting a section of the waste slag pool is used as a heat source to preheat the process air before its entry into the other section of the slag pool. Excess waste slag from the pool may be contacted with water to form a granulated solid slag construction material and steam. If desired, the steam so produced and flue gas exiting the first stage preheater may be passed in a heat exchange relationship through another heat exchanger to superheat steam. In a second suggested mode of operation a continuous supply of preheated air to the process is provided for by a plurality of air preheat units operated cyclically and arranged in parallel with one or more units serving to preheat the incoming process air while other units are being regenerated by hot flue gas exiting the process. In this latter mode of operation each air preheat unit is in the form of a pool of collected molten waste slag paired with a heat regenerator. In one cycle flue gas is passed, in succession, through the slag pool and then through the heat regenerator of a given unit and, in the next cycle for that unit the incoming process of air is passed, in succession, through the heat regenerator and then the slag pool. These cycles are repeated in succession so that the temperature of the air exiting the slag pool is maintained within a predetermined range. High temperature air preheating enables operation with use of little or no oxygen and electricity in the process by utilization of the heat content of waste products.

In another aspect of the present invention a steel jet entering a vessel for degasification is saturated with argon at a pressure higher than argon pressure in the vessel. This results in the atomization of the metal jet as it enters the degasification vessel.

Yet another aspect of the present invention relates to the formation of metal sheet from a metal melt by forcing metal melt through a slot-shaped orifice into a space defined between two parallel plates. In one embodiment the plates are arranged generally in the horizontal and at least the lower plate is provided with a plurality of aperatures for injection of an inert gas to form a gas pillow to cool, solidify and support the formed metal sheet.

BRIEF DESCRIPTION OF THE DRAWINGS

In the drawings:

FIG. 2 is a flow diagram of a preferred embodiment for air preheat;

FIG. 6 is a schematic illustration of one embodiment for forming metal sheet;

FIG. 7 is a schematic illustration of an alternative sheet-forming embodiment;

FIG. 8 is a schematic illustration of another embodiment for metal sheet-forming;

FIG. 9 is a schematic illustration of yet another embodiment for sheet-formation; and FIG. 10 is a schematic illustration of another embodiment for sheet-formation.

DESCRIPTION OF THE PREFERRED EMBODIMENTS

Figure 1:
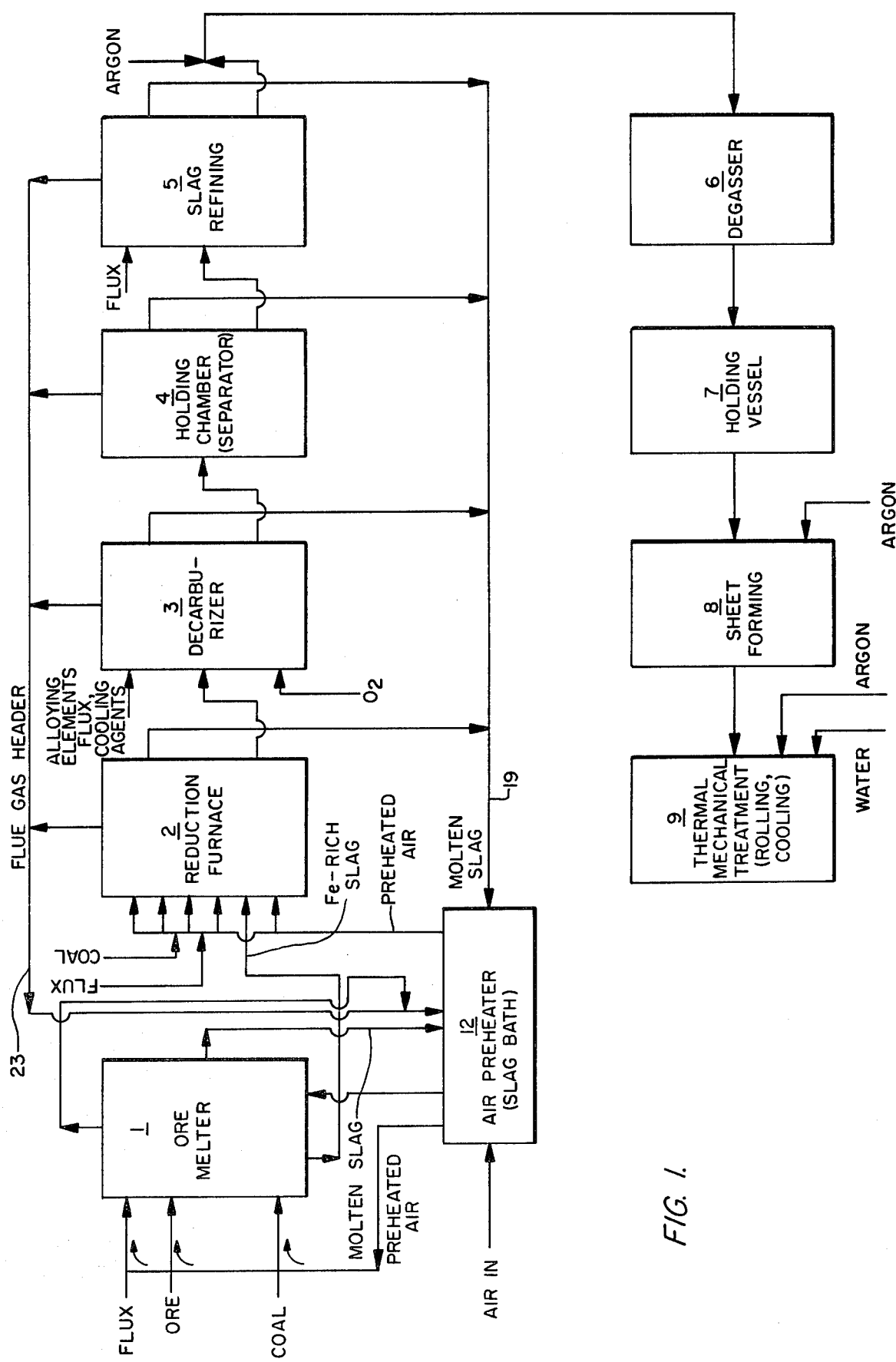
FIG. 1 is a flow diagram of one preferred embodiment of the present invention.

One preferred embodiment of the present invention is shown in FIG. 1 which diagrammatically illustrates an integrated steel plant. The integrated process depicted in FIG. 1 utilizes sealed, pressurized furnaces linked in series. As shown in FIG. 1, preheated air, coal, flux and ore concentrate are introduced into melting furnace 1 through a plurality of side tuyeres. Within melting furnace 1 the ore and flux are absorbed by a melt at 1300°-1600° C. The heat of smelting is delivered by the injection of the preheated air, off-gas from downstream reactors, and by the combustion of coal. Iron values from the ore are absorbed into the resultant slag layer as iron oxides and the iron-rich slag phase settles toward the bottom of reactor 1 from which it is continuously removed through a bottom orifices and transferred to reduction furnace 2. Slag of low iron content is continuously removed from the upper portion of the slag layer and transferred to the slag path in heat exchanger 12 to be described in more detail later. Jets of air and off-gases ensure intensive mixing of the melt in this furnace.

The crushed iron ore concentrate and fluxing agent added into the slag melt formed in reactor 1 are most conveniently injected with the blast of preheated air. Conventional fluxing materials such as limestone, dolomite, fluorspar, etc. are employed. If additional heat is required to maintain the slag melt at 1300°-1600° C., a suitable quantity of powdered coal is also injected with the air. A high ratio of air to coal ensures complete combustion to carbon dioxide so that little reduction of the absorbed iron oxides will occur in reactor 1.

The air to furnace 1 is supplied by a compressor (not shown) and is preheated to about 1200°-1500° C. by bubbling through the slag pool collected in heat exchanger 12. The slag pool in heat exchanger 12 is continuously fed by slag 19 withdrawn from furnace 1 and additional slag withdrawn from reactors 2, 3, 4 and 5, yet to be described. As will be described in more detail in conjunctin with FIG. 2, vessel 12 is preferably divided into two separate chambers or units with the slag circulating between them. With such a preferred arrangement flue gas from header 23 may be used to heat the slag in one unit or chamber, while process air is preheated in the other.

In reduction furnace 2, the iron oxides contained in the iron-rich slag phase received from furnace 1 are reduced in accordance with reactions similar to those occuring in conventional steel making furnaces.

$$3Fe_2O_3 + C \rightarrow 2Fe_3O_4 + CO$$

$$Fe_3O_4 + C \rightarrow 3FeO + CO$$

$$FeO + C \rightarrow Fe + CO$$

to a small degree carbon monoxide is also oxidized:

$$3Fe_2O_3 + CO \rightarrow 2Fe_3O_4 + CO_2$$

$$Fe_3O_4 + CO \rightarrow 3FeO + CO_2$$

$$FeO + CO \rightarrow Fe + CO_2$$

As the iron oxides are reduced, droplets of iron form in the slag layer and separate by gravity to form a lower metal layer within the furnace 2. Crushed coal and flux are mechanically injected or pneumatically injected with preheated air through a plurality of tuyeres vertically spaced along the height of the melt. By distributing the feeds in this manner the rate of raw material absorption and rate of reduction may be controlled. The air jets in combination with the rising bubbles of CO serve to thoroughly agitate the contents of the furnace. Air injected through jets into the upper portion of the slag layer and, optionally, through additional jets above the slag surface provide for combustion of CO and C for heat to support the reduction of the iron oxides.

It is possible to inject the slag from the first zone into the ferrous metal in the lower part of the second zone whereby the iron oxides carried by the injected slag are reduced by the carbon in the metal phase. A constant concentration of carbon in the ferrous metal is sustained by the continuous dissolving of carbon from coal supplied to the metal phase.

The ratio between mass flow rate of slag supplied to the second zone and mass of melt within the reaction determines whether the furnace operates in a "semi-batch mode" (at low values of this ratio) or in a continuous flow mode (at high ratios). Furnace 2 is operated at an elevated pressure, i.e., 1–20 atm, to control foaming, to facilitate required rate of gas evolving at and to facilitate transfer of the melts to other furnaces. As previously noted, the off-gas from furnace 2 is collected in the off-gas heater 23 and is used as a heat source for furnace 1.

Figure 1A:
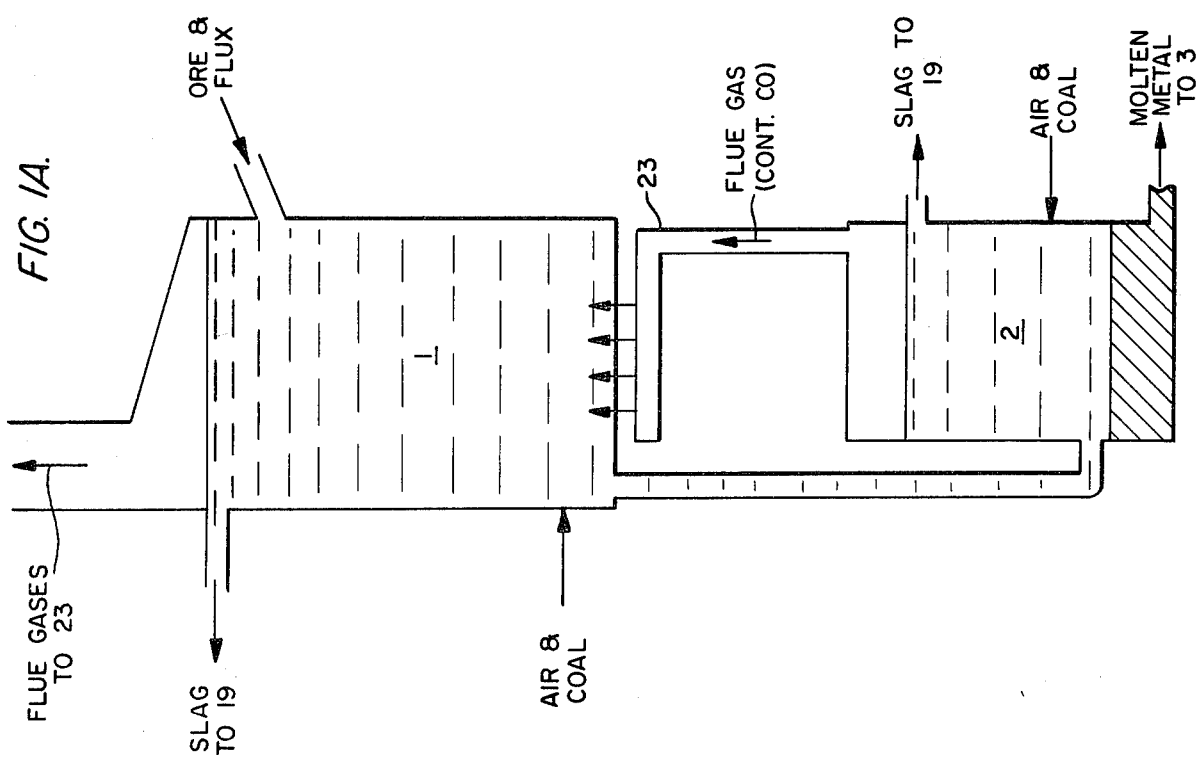
FIG. 1A is a schematic illustration showing one arrangement for furnaces 1 and 2 of the embodiment of FIG. 1.

The pressure in reduction furnace 2 is higher than that in ore melting furnace 1 to allow for flow of flue gas to melting furnace 1. Flow of iron-rich slag from furnace 1 to furnace 2 may be provided for by installation of furnace 1 on a level above that of furnace 2 as illustrated in FIG. 1A.

By dividing the conversion of ore to iron into separate unit processes, a number of significant advantages are obtained. Firstly, combustion of CO is the main source of heat, yet operation of furnace 2 under reducing conditions requires a high ratio of $CO/CO_2$. By burning coal to $CO_2$ in furnace 1 the full value of the coal burned in furnace 1 may be completely utilized without interfering with the iron oxide reduction. Secondly, this separation of operations allows furnace 1 to be operated at a temperature substantially lower, e.g. about 50°–200° C. lower, than that of furnace 2 and reduces in size the mass of material which must be treated at the higher temperature. Thirdly, a greater amount of impurities can be separated from the metal than in conventional processes wherein ore smelting and reduction operations are performed simultaneously in the same furnace. This improvement takes into account the fact that some impurities are best absorbed into slag and separated in an oxidizing atmosphere, whereas others are best absorbed and separated in a reducing atmosphere. Operation in accordance with this preferred embodiment allows for efficient separation of both types of impurities. Fourthly, the load on reactor 3 is substantially reduced. For example, separation of $SiO_2$ from iron oxides in furnace 1 eliminates the need for oxidation of Si in reactor 3.

One economy realized by practice of the preferred embodiment of the present invention is in the use of air rather than oxygen for combustion in furnace 2. With the temperature of air preheating at about 1600° K. and temperature of the flue gases at about 1900° K., the air based carbon combustion has the same thermal efficiency that oxygen based combustion. Therefore air preheating to a temperature of 1200°–1500° C. enables replacement of oxygen by air in the high-temperature technology with improvement in thermal efficiency. Use of side tuyeres of proper diameter and angle in inclination is also believed to be and improvement over the use of an oxygen lance which enters from the top, which improvement along with preheating enables the substitution of air for oxygen without deleterious effect on the thermodynamic and kinetic conditions within furnace 2.

The molten iron "semiproduct" which collects in the bottom of reactor 2 will typically contain about 0.3–1.0% carbon, as well as some impurities, e.g. sulfur, phosphorus, which were not removed in the first and second zones. This "semiproduct" is transferred to reactor 3 where it is tested with oxygen in what is essentially a conventional technique for the conversion of pig iron into steel. In reactor 3 the metal "semiproduct", under a protective flux, is blasted with pure oxygen at a controlled flow rate to decarburize the metal down to the desired carbon content, on the order of 0.25%. In addition to decarburization, the oxygen serves to oxidize impurities, such as silicon, phosphorus and manganese, which are thus extracted from the molten metal and are absorbed, at least in part, in the slag. The iron "semiproduct" is continuously fed from above into the melt which should be intensively agitated, for example in the manner taught by U.S. Pat. No. 4,052,197 issued to Brotzman, et al. Slag forming agents, desulfurizing agents and cooling agents may be injected directly into the metal bath. Because the reactions between oxygen and various impurities contained in the iron melt are highly exothermic, conventional practice calls for addition of various cooling agents such as scrap iron, iron oxides, etc. Iron oxides injected into the melt serve the dual purpose of accelearting oxidation and cooling. The principal slag-forming agent used in this step is limestone which itself cools the melt by endothermic decomposition yielding $CO_2$ which serves to further agitate the melt. The resultant lime forms a basic slag cover which serves to absorb $SiO_2$, $MnO_2$ and other oxides liberated from the melt.

The oxygen in the reactor 3 may be replaced by iron ore. The necessary heat can be delivered to the reactor by supplying air and coal to the slag layer.

The mode of operation of reactor 3 determines the final composition of the steel product. In the preferred embodiment shown in FIG. 1 reactor 3 is operated as a decarburizer with cooling agents added to control the highly exothermic reaction. However, if desired, reactor 3 can also be operated as a carburizer with heating, e.g. by electrical induction or coal combustion. Various alloying elements may also be introduced into reactor 3.

The steel product formed in reactor 3 is continuously drawn off from the metal melt and transferred to holding chamber 4 where the temperature and composition of the metal are allowed to average and gases and slag components are allowed to separate and are drawn off.

If further refining is required, the molten steel is drawn from holding chamber 4 and is injected as a jet of atomized metal into a slag melt in reactor 5. The conventional electro-slag refining process (ESR) has demonstrated that atomization in slag provides a very large metal surface area for reaction and allows refining to a high degree of purity. In the process of the present invention the need for electrical energy is eliminated because the metal fed to reactor 5 is molten. Moreover, a higher degree of atomization is achieved. In the present process metal atomization is in part the result of the oxidation of carbon within the metal phase and an additional increment of atomization is achieved by a pressure differential between hold tank 4 and reactor 5, on the order of up to 1 atmosphere. When metal entering reactor 5 is depressurized the equilibrium of CO dissolved within the metal phase is shifted and CO is liberated to provide the additional increment of atomization. Treatment in reactor 5 provides for a further reduction of impurities, notably sulfur and phosphorus.

The refined metal from reactor 5 is next stripped of residual gases by treatment with an inert gas. A metal stream entering reactor 6 is impinged by a jet of a protective gas such as argon. Argon gas is injected into the nozzle through which the metal melt is introduced into reactor 6 and is initially dispersed therein as a discontinuous phase. As the metal stream enters the interior of reactor 6, and drops through the argon atmosphere contained therein, a drastic pressure reduction results and a phase inversion occurs in which the metal stream is again atomized. Degasification here is similar to that in vacuum melting process. The degassed steel melt collects in the bottom of reactor 6 and is continuously transferred to a vessel 7 where the melt is held at 1520°–1550° C. for subsequent feed to solidification and shaping operations. Although the composition of the end-product is generally set in reactor 3, if desired, additives can be introduced into vessel 7 for the purpose of further adjusting the composition of the steel product.

The refined steel product produced as described above may then be solidified and shaped in any conventional manner, e.g. by continuous casting or pouring in molds. However, the present invention provides a more effective means of solidification and forming which enables control of the metal properties and recovery of the heat content of the molten metal. For example, in unit 8 (as will be described in more detail in connection with FIG. 6) steel sheet may be formed by continuously removing the liquid metal from a slot-shaped orifice provided at the bottom of holding vessel 7 and supporting the liquid metal stream on an inert gas, e.g. argon gas, blanket formed by impinging the liquid metal stream with a plurality of argon jets. The metal sheet forms a "hydrofoil" as it slides over the argon pillow and at the same time is impinged from above by argon jets to protect the sheet against contamination and to provide the desired rate of cooling. A high heat exchange co-efficient exists between the argon gas jets and the steel strip and, as a consequence, a high rate of solidification is achieved. The solidification in the liquid layer, flowing between two extremely turbulent gas pillows, enables control of the thickness of the layer as well as the rate of cooling and results in metal properties similar to or better than those obtained in in ESR or vacuum melting, without, however, high energy consumption. The sheet formed on an argon blanket in unit 8 may then be passed through rolling mill 9 and a cooler 10 to provide a sheet product.

Another technique for producing metal sheet of the required thickness is by pouring an additional portion of a melt of the same or another metal onto the upper surface of a solid metal sheet, creating a thin liquid layer with rapid solidification of this layer by argon jets. In such a way the required thickness of an end product may be achieved by controlled homogeneous solidification of consecutively applied thin layers.

As previously mentioned a key feature of the present invention, and of the energy economies which it embodies, resides in the utilization of slag at 1300°–1600° C. as a heat source. A preferred embodiment for the utilization of waste slag as a heat source will now be described in greater detail with reference to FIG. 2. FIG. 2 shows the molten slag heat exchanger divided into two units or chambers 12A and 12B. The molten slag in 12B is less saturated with gas and therefore more dense than the molten slag in 12A and, accordingly, will flow from 12B to 12A through the lower conduit. The rate of continuous recirculation between the two units or chambers 12A and 12B through conduits 52 may be controlled by regulation of gas flow rates, by maintaining a differential in the respective levels of the molten slag and/or by positioning the various slag inlets and outlets for conduits 52 to provide for static head differentials. Typically the upper conduit 52 will enter 12B above the level of molten slag. As is further shown in FIG. 2 the ambient air is preheated in two stages. In the first stage compressed ambient air (from a compressor not shown) is heated in heat recuperator 11, a conventional dual-path ceramic brick heat exchanger, by heat exchange with flue gas exiting the molten slag heat exchanger 12A. The heated air exiting recuperator 11 (first stage air preheater) is further heated by direct contact with molten slag in 12B wherein it is injected into the bottom of the vessel through a plurality of ports or gas dispersion means. Molten slag heat exchanger 12B operates in a counter-current fashion with the air bubbling upward through the molten slag and the molten slag circulating from top to bottom. The molten slag contained in vessel 12A is continuously heated by direct contact with the flue gas collected in header 23 from the various process furnaces. The flue gas is dispersed and bubbled through the molten slag in 12A and then sent to heat recuperator 11 as previously described. If additional heating of vessel 12B is required, coal may be injected with the incoming air. Likewise, coal and air may be injected into vessel 12A. Slag over-flow from 12A is injected into vessel 14 wherein it is cooled and granulated by a water spray which is thereby converted to steam. The solidified granular slag product removed from the bottom of vessel 14 may be used as a construction material. Steam from 14 is further heated in conventional tubular heat exchanger 13 by counter-current heat exchange with flue gas exiting heat exchanger 11.

Figure 3:
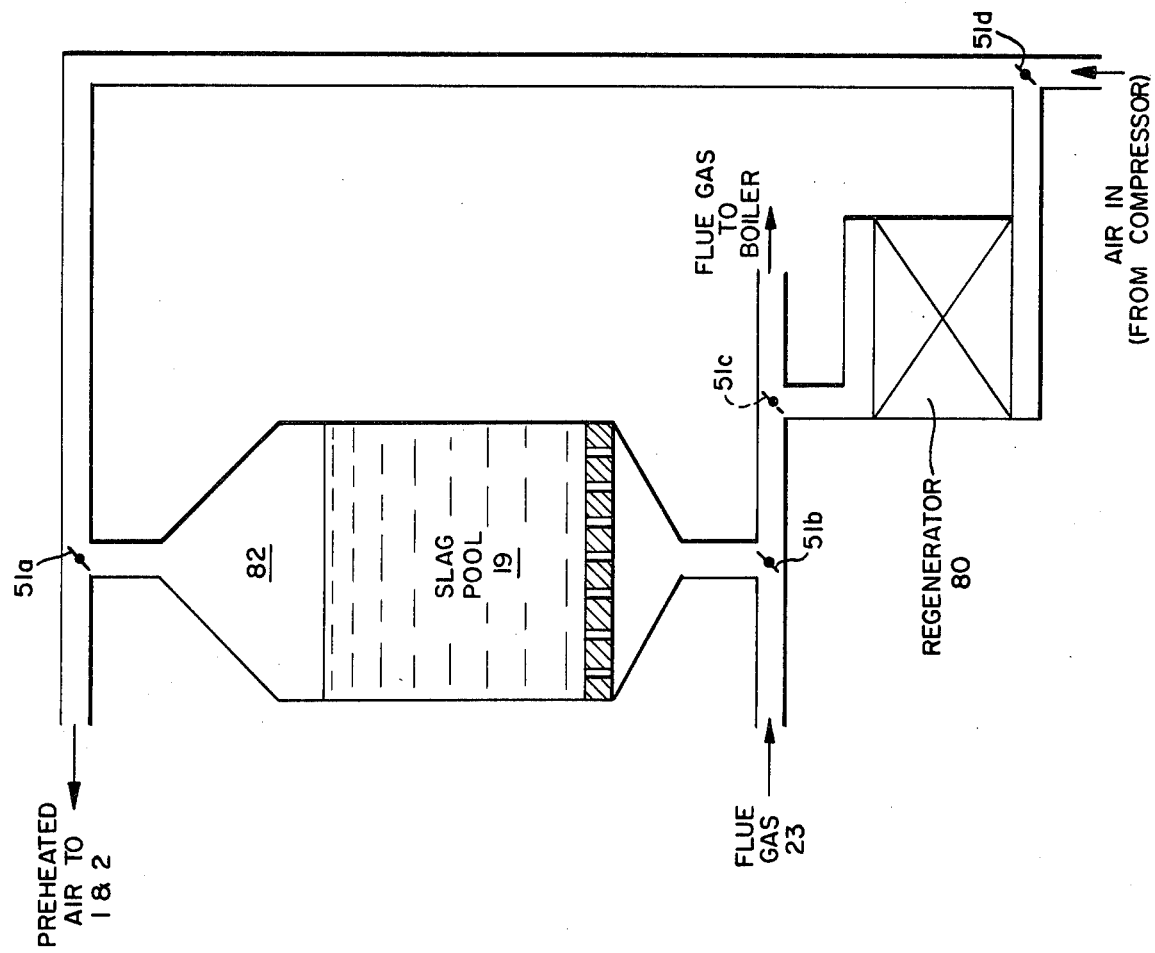
FIG. 3 is a schematic illustration of another embodiment for air preheat.

An alternative system for utilizing the heat of molten slag to preheat process air is shown in FIG. 3. FIG. 3 shows a heat regenerator 80 linked in series with vessel 82 holding a bath of molten slag 19. Regenerator 80 is a conventional heat exchanger, similar to heat recuperator 11 of FIG. 2, but having a single gas flow path defined by the ceramic bricks contained therein. These vessels operate cyclically in parallel with pairs of like vessels to provide a continuous flow of preheated air to furnace 1. In the cycle shown in FIG. 3, flue gas 23 is passed, successively, through the slag bath in vessel 82 and then through regenerator 80. Upon the regenerator 80 reaching a predetermined temperature the positions of valves 51a, 51b, 51c and 51d are switched, the flow of flue gas through the units discontinued and process air passed, successively, through regenerator 80 and slag heater 82. Upon the temperature of regenerator 80 falling below a predetermined value the positions of valves 51 are again reversed and the cycle is repeated.

Figure 4B:
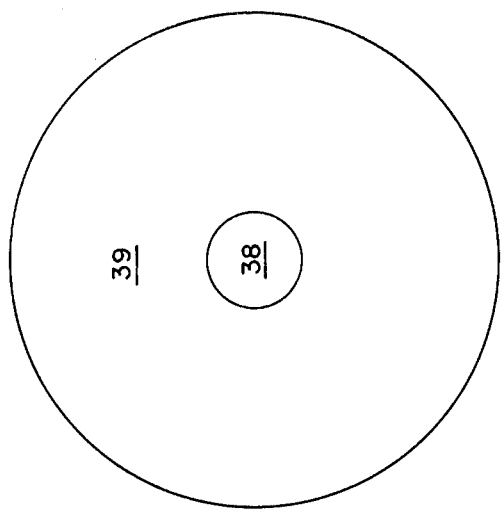
FIGS. 4A and 4B schematically illustrate an embodiment of the present invention wherein two reaction zones are combined and established in a single furnace.
Figure 4A:
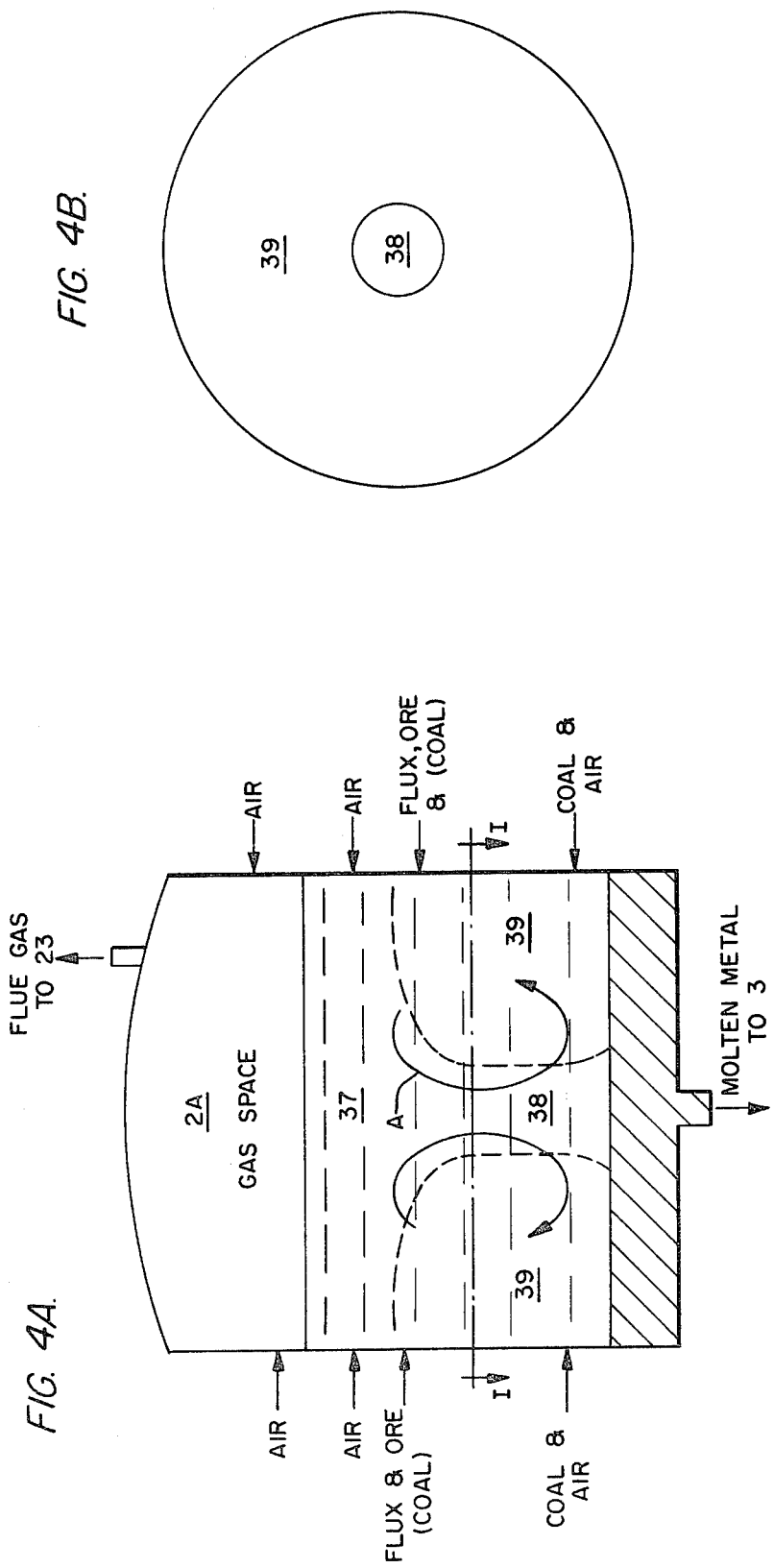

FIGS. 4A and 4B depict an embodiment wherein the ore melting function of furnace 1 and the ore reduction of furnace 2, as depicted in FIG. 1, are combined in a single reactor 2A. Preheated air is injected into the upper portion of reactor 2A at a plurality of points around its circumference to create melt flow zone 37. The air injected into zone 37 oxidizes the carbon, carbon monoxide and slag elements as they enter zone 37 from peripheral zone 39 below. The major portion of the coal to furnace 2A is injected into the lower portion of the slag in zone 39 and reacts to form carbon monoxide and to reduce iron oxides absorbed into the slag in zone 37 and received through zone 38. Upward flow through reducing zone 39 is induced by the gases injected thereon (e.g. nitrogen component of air) and generated therein, resulting in circulation of slag within the slag layer as depicted by arrows 36. With reference to FIG. 4B, the rising gases cause flux to flow upward through reducing zone 39 into melting (oxidizing) zone 37 where, upon reaching the upper surface of zone 37, the gas is released and the densified slag then circulates downward through zone 38. Carbon monoxide which is generated in zone 39 is converted to carbon dioxide as it comes into contact with air entering through jet 34 resulting in the generation of an additional increment of heat in carbon dioxide zone 37. Ore, flux and, optionally, a minor portion of the coal are injected into the slag at points in close proximity to air jet or jets 34. These additives are carried by the air jet and melted in carbon dioxide zone 37A. Because carbon monoxide generated within 39 is oxidized to carbon dioxide as it enters zone 37, zone 37 operates as a melting zone with little reduction of iron oxides in a manner analogous to the operation of furnace 1 in the embodiment of FIG. 1. Slag containing the iron oxides absorbed from the ore travels downwardly through zone 38 and enters carbon monoxide zone 39 wherein it is reduced as in the operation of furnace 2 in the embodiment of FIG. 1. An additional air jet(s) 35 may be provided in the gas space above the molten slag to oxidize any residual carbon monoxide. It can be appreciated from the foregoing that the molten slag in reactor 2A is thoroughly mixed, i.e. by the gas generated, by the reactants injected into the slag, by the difference in density between the slags in zones 38 and 39 and by the air jets.

Figure 5:
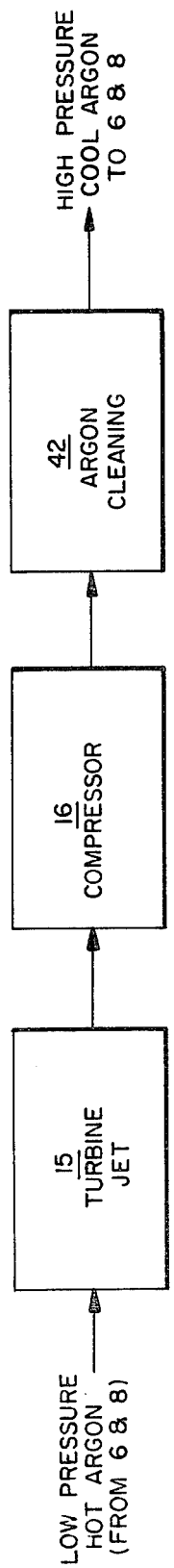
FIG. 5 is flow diagram illustrating the utilization and recovery of heat given up by molten metal upon solidification.

Yet another energy economy included in the preferred embodiment is that whereby the heat given up by the molten metal during gas refining in the reactor 6 and the sheet forming and cooling processes is recovered as sensible heat from the argon gas exiting degaser 6 and sheet former 8. As illustrated in FIG. 5 a compressor 16 is driven by a turbine jet 15 which, in turn, is driven by the hot argon which exits units 6 and 8 at a pressure of approximately 1-2 atmospheres. Thus the hot argon gas drives turbine jet 15 which optionally produces electricity and in turn drives compressor 16 and serves to compress the argon exiting turbine 15 by operation in a Brayton cycle.* The overall thermal efficiency of the cycle depends on the energy losses in supply lines and nozzles. High pressure, cooled argon exiting compressor 16 may optionally be cleaned in a gas purifier 42 prior to recycle to degaser 6 and sheet former 8.

*G. Van Wyler, R. Sonntag, *Fundamentals of Classical Thermodynamics*, John Wiley, 1978, p. 335–336, FIG. 9.25(b), the teachings of which are incorporated herein by reference.

Metal solidification and sheet forming by an argon pillow or "hydrofoil" technique, as incorporated into the embodiment previously described in connection with FIG. 1, is shown schematically, in more detail, in FIG. 6. As shown in FIG. 6 liquid metal is forced out of the slot-shaped orifice at the bottom of holding vessel 7 at a rate proportional to the total of the static head and gas pressure within vessel 7. Initially, the molten metal flows over a thin support strip 70 made of ceramic, asbestos, or metal. The metal melt solidifies as it passes through a gap between upper and lower horizontal, aperatured plates 72 and 74. Argon at a pressure of 1.5–20 atmospheres in high pressure header 50 passes through the apertures as an array of jets to create a frictionless support pillow for the moving metal strip. A protective gas (argon) blanket is simultaneously applied to the top of the solidifying strip from a low pressure header 49. The argon exiting these gaps is fed to turbine 15 as previously described in connection with FIG. 5. Experimental investigation has shown that the coefficient of heat exchange between argon jet arrays and hot metal sheet can be 1000 to 1500 BTU per square foot hour. The rate of heat extraction from the metal and consequently the rate of cooling and solidification is determined by the rate of gas supply and gas flow characteristics in the header 50. The thermal treatment may be combined with mechanical treatment by rolls 9 which may also be operated in a protective atmosphere.

Another scheme for sheet formation is shown in FIG. 7, wherein the same or different molten metal is poured onto presolidified metal at a plurality of points distributed along the travelling sheet. The sheet may be mechanically worked by rolling between the points where the molten metal is applied.

Alternative schemes for metal solidification and production of steel sheet or slab are shown in FIGS. 8, 9 and 10. In the embodiment depicted in FIG. 8 units 6, 7 and 8 of the previously described embodiment are eliminated and steel sheet or slab is produced directly from the melt accumulated at the bottom of slag refiner 5 by means of rolling mill 60. In the embodiment depicted in FIG. 9, operation of degasser 6, previously described, is modified for operation as a fluidized bed with the temperatures of the incoming metal and argon gas regulated so that the droplets of atomized and fluidized metal are cooled to a temperature approaching the temperature of solidification when collected at the bottom of the vessel 6. Degassification and atomization is provided for by argon injection in a manner previously described. Additionally, fluidization is provided for by injection of argon through a plurality of points at the bottom of the vessel as indicated by the arrows. Again, steel sheet or slab 43 is formed by a roll mill 62. The solidification can be completed in a gas flow or by quenching in water bath.

Yet another alternative for forming steel sheet employs a modified version of holding vessel 7 as depicted in FIG. 10. In FIG. 9 relatively cool steel strip 64 is fed by feed rolls 66 and rolling mill 68 through the bath of liquid metal in holding tank 7. As the cool strip 64 enters the molten metal bath, steel crystallizes on its surface. The temperature of the incoming strip 64 and its residence time within the molten metal bath are regulated to prevent remelting of the surface deposit. The steel strip carrying the newly formed steel surface deposit is then rolled by mill 68 to form a finished product 43 of the desired thickness.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A process for producing ferrous metal products from an ore containing iron oxides, said process comprising:
    (a) melting fluxing agents and the iron oxide ore together under oxidizing conditions in a melting furnace to form a molten slag, with little reduction of the iron oxide ore;
    (b) allowing said molten slag to stratify whereby iron oxide-rich slag collects at the bottom of said melting furnace;
    (c) transferring said iron oxide-rich slag from the bottom of said melting furnace to a reduction furnace separate from said melting furnace;
    (d) injecting coal and air into said reduction furnace to form carbon monoxide and to establish reducing conditions within said reduction furnace, thereby reducing the iron oxides to form a molten ferrous metal product; and
    (e) injecting into the molten slag within said reducing furnace, below the surface of the slag, (1) the off-gas from said reduction furnace containing carbon monoxide and (2) air for combustion of said carbon monoxide to form carbon dioxide, thereby establishing said oxidizing conditions within said melting furnace.

2. The process of claim 1 wherein the molten slag in said reducing furnace is maintained at a temperature at least 50° C. higher than in said melting furnace.

3. The process of claim 1 wherein the molten slag in said melting furnace is at a higher level than the molten slag in said reducing furnace to facilitate melt flow to the reducing furnace.

4. The process of claim 1 wherein said reducing furnace is maintained at an elevated pressure of 1-20 atmospheres, said elevated pressure being higher than that in said melting furnace.

5. The process of claim 1 wherein additional quantities of ore are injected into the slag melt in said melting furnace below the surface of the melt and melted therein.

6. The process of claim 5 wherein said additional quantities of ore are pneumatically injected into said melting zone with the air.

7. The process of claim 1 wherein said air to said melting furnace is preheated to 1300°-1600° C.

8. A process for producing ferrous metal products from an ore containing iron oxides, said process comprising:
    (a) melting fluxing agents and the iron oxide ore together in a first zone to form a molten slag;
    (b) allowing said molten slag to stratify whereby iron oxide-rich slag collects at the bottom of said first zone;
    (c) transferring said iron oxide-rich slag to a second zone;
    (d) injecting coal and air into said second zone to form carbon monoxide and to reduce the iron oxides to form a molten ferrous metal product;
    (e) transferring off-gas from said second zone containing carbon monoxide to said first zone and combusting said off-gas with air in said first zone;
    (f) removing slag from at least one of said first and second zones and collecting said removed slag as a pool of molten slag; and
    (g) passing the air to at least one of said first and second zones through said pool of molten slag to preheat said air.

9. The process of claim 8 wherein said air is preheated to 1300°-1600° C.

10. The process of claim 8 further comprising:
    dividing said pool of molten slag into first and second heat exchange sections and continuously circulating the molten slag between said first and second heat exchange sections;
    collecting flue gas from at least one of said first and second zones and passing said flue gas through the molten slag in said first section, thereby continuously heating the slag pool; and
    passing the air to at least one of said first and second zones through said molten slag in said second section to preheat the air.

11. A process in accordance with claim 10 wherein said air is preheated in two stages, said process further comprising:
    passing said flue gas exiting said first section and said air entering said second section in a heat exchange relationship through a first-stage air preheater.

12. A process in accordance with claim 11 further comprising:
    removing molten slag from said pool and contacting the molten slag from said pool with water to form granulated solid slag and steam; and
    passing said steam and said flue gas exiting the first stage air preheater, in heat exchange relationship, through a steam superheater.

13. A process in accordance with claim 8 further comprising:
    providing a plurality of parallel molten slag pools and a heat regenerator paired in series with each slag pool;
    passing a flow of flue gas, in succession, through the slag pool and then the heat regenerator of one pair;
    discontinuing the flow of flue gas through said one pair and then passing the air to at least one of said first and second zones, in succession, through the heat regenerator and slag pool of said one pair; and
    successively alternating the flows of flue gas and air through said one pair to maintain the temperature of the air exiting the slag pool within a predetermined range.

14. In a metallurgical process for the separation of metal values from a raw material into a molten slag phase utilizing air as a reactant, the improvement comprising:
    collecting molten slag from the process into a pool of molten slag divided into first and second zones;
    continuously circulating the slag between said first and second zones;
    passing the air to the process through said second zone of said pool to preheat the air; and collecting hot flue gas from the metalurgical process and passing said flue gas through the molten slag in said first zone, thereby continuously heating the slag pool.

15. A process in accordance with claim 14 wherein said air is preheated in two stages, said process further comprising:

passing said flue gas exiting said first zone and said air entering said second zone in heat exchange relationship through a first stage air preheater.

16. A process in accordance with claim 15 further comprising:

removing molten slag from said pool and contacting the molten slag from said pool with water to form granulated solid slag and steam; and passing said steam and said flue gas exiting the first stage preheater, in heat exchange relationship, through a steam superheater.

17. A process in accordance with claim 14 further comprising:

providing a plurality of molten slag pools in parallel and a heat regenerator paired in series with each slag pool;

passing a flow of flue gas, in succession, through the slag pool and then the heat regenerator of one pair;

discontinuing the flow of flue gas through said one pair and then passing the air to at least one of said first and second zones, in succession, through the heat regenerator and slag pool of said one pair; and successively alternating the flow of flue gas and air through said one pair to maintain the temperature of the air exiting the slag pool within a predetermined range.

18. A process for producing ferrous metal products from an ore containing iron oxides, said process comprising:

(a) melting fluxing agents and the iron oxide ore together in a first zone to form a molten slag;

(b) allowing said molten slag to stratify whereby iron oxide-rich slag collects at the bottom of said first zone;

(c) transferring sid iron oxide-rich slag to a second zone;

(d) injecting coal and air into said second zone to form carbon monoxide and to reduce the iron oxides to form a molten ferrous metal product;

(e) transferring off-gas from said second zone containing carbon monoxide to said first zone and combusting said off-gas with air in said first zone;

(f) collecting the molten iron or still metal product at the bottom of said second zone and transferring said metal product to a third zone;

(g) contacting the molten metal product in said third zone with oxygen or air to reduce the carbon content;

(h) holding the metal from said third zone in a quiescent fourth zone to allow residual slag and gas impurities to separate;

(i) injecting the molten metal from said fourth zone into a reactive molten slag in a fifth zone for further purification; and (j) atomizing the molten metal from said fifth zone in the presence of an inert gas to wash out residual dissolved gas.

19. A process for producing ferrous metal products from an ore containing iron oxides, said process comprising:

(a) melting fluxing agents in a cylindrical furnace to form a cylindrical body of molten slag, said body being in communication with a gas space above its upper surface;

(b) injecting air and coal into a lower portion of said body of molten slag to establish reducing conditions and a reducing zone; and (c) injecting additional air into an upper portion of said body of molten slag from a plurality of points surrounding the circumference of said body of molten slag to establish oxidizing conditions and a melting zone, said coal reacting with air in said reducing zone to form carbon monoxide which circulates into said melting zone for reaction with said additional air, said air injection into said melting zone creating a flow pattern of molten slag moving radially toward the center of said body, said radially moving molten slag becoming densified as it releases gas into the gas space above said melting zone, and said densified slag circulating downwardly through the center of said slag body and into said reducing zone.

* * * * *